United States Patent [19]

Pavlin et al.

[11] Patent Number: 4,711,927
[45] Date of Patent: Dec. 8, 1987

[54] AQUEOUS INK COMPOSITION

[75] Inventors: Mark S. Pavlin; James C. West, both of Lawrenceville, N.J.

[73] Assignee: Union Camp Corporation, Wayne, N.J.

[21] Appl. No.: 929,458

[22] Filed: Nov. 12, 1986

[51] Int. Cl.$^4$ ............................................. C08F 255/08
[52] U.S. Cl. ...................................... 524/531; 526/285
[58] Field of Search ................ 524/531, 572; 525/285, 525/301

[56] References Cited

U.S. PATENT DOCUMENTS

| | | | |
|---|---|---|---|
| 3,984,381 | 10/1976 | Tsuchiya | 525/285 |
| 4,056,498 | 11/1977 | Laurito | 525/285 |
| 4,079,102 | 3/1978 | Wagner | 525/285 |

Primary Examiner—Paul R. Michl
Attorney, Agent, or Firm—Edward J. Sites

[57] ABSTRACT

Aqueous ink compositions are disclosed which are an admixture a colorant, a resin binder which is the Diels-Alder adduct of maleic anhydride and 2,3- and 6,7-poly(alloocimene) or the partial-ester thereof and a solvating proportion of water. The inks are useful in flexographic and gravure printing.

4 Claims, No Drawings

AQUEOUS INK COMPOSITION

The invention relates to ink compositions and more particularly relates to aqueous ink compositions.

BACKGROUND OF THE INVENTION

An extensive description of the prior art is found in the Kirk-Othmer Encyclopedia of Chemical Technology (Second Edition). According to this reference, "writing ink was first prepared and used by the Chinese and the Egyptians as early as 2600 B.C."; see Vol. II, pages 611–632. In spite of its antiquity, the development of ink compositions continues today to meet demands for quality improvement, economy, and reduced environmental impact. Representative of more recent improvements in the art are the use of synthetic resin binders in the ink compositions which improve sharp printed images and rub-resistance; see, for example, the half-esters of styrene-maleic anhydride copolymers described in U.S. Pat. No. 3,563,937.

SUMMARY OF THE INVENTION

A novel ink composition is disclosed which is comprised of:

(a) a coloring proportion of a colorant;

(b) a resin binder selected from the group consisting of the Diels-Alder adduct of maleic anhydride and a poly(alloocimene) having chain units comprised of a mixture of greater than 50 percent 2,3- and 6,7-poly(alloocimene) and less than 50 weight percent 4,7-poly(alloocimene) chain units, or the partial-esters thereof; and (c) water in a sufficient proportion and containing a sufficient proportion of alkali or organic base to solvate the binder.

The compositions of the invention are stable, alcohol dilutable aqueous inks, useful for flexographic and gravure printing on paper and like surfaces.

DETAILED DESCRIPTION OF THE INVENTION

The composition of the invention may be prepared by simple admixture of the above-described ingredients, employing conventional apparatus and techniques for mixing materials, in proportions commensurate with their functions in the compositions. Generally, the vehicle or varnish is first prepared and the colorant added to the vehicle as the last ingredient.

A wide variety of suitable colorants are known and conventionally employed to color ink formulations can be used in the ink composition of this invention. Representative of such colorants are water-soluble dyes and water-dispersible pigments. Representative of dyes are the nigrosine dyes, triphenylmethane dyes, rhodamine dyes, thioflavine dyes, auramine dyes, quinonimide dyes, xanthane dyes, sulphonated triphenylmethane dyes, and nitro dyes. Pigments include lamp black, zinc oxide, titanium oxides, malachite green, iron blue, cadmium yellow, and the like.

The amount of dye in any ink formulation depends upon the characteristics of the coloring material. Some dyes, even when used in small quantities, are capable of imparting sufficient color to lend legibility to the copy. With others, it is necessary to use higher concentrations of dye to secure the desired effect. The lower limit of dye concentration is determined by its tinctorial strength, which may vary widely from compound to compound. The upper limit is often influenced by solubility factors or by the effect of the dye on other ingredients of the ink composition. Optimal concentrations for a given dye may be determined by trial and error technique to determine a colorant proportion. When pigments are used, it is often desirable to use concentrations higher than 3% by weight, with the upper limit being in the range of about 15% by weight or more in some instances.

The resin binder components of the ink compositions of the invention are adducts of maleic anhydride and a particular poly(alloocimene) or the partial-ester thereof. The resin binder is used in a sufficient proportion to form a dried film with the colorant, on a surface to be marked with the ink. In general, a sufficient proportion comprises one within the range of from about 1 to about 40 weight percent of the ink composition of the invention, preferably 5 to 25 weight percent and more preferably 7 to 17 weight percent.

The adducts employed as resin binders in the compositions of the invention may be prepared by the Diels-Alder reaction of maleic anhydride with a particular poly(alloocimene).

The poly(alloocimene) employed to prepare the adduct polymer is the homopolymer of alloocimene having a weight average molecular weight of from about 500 to 100,000 and which contains repeating or recurring chain moieties of the formula:

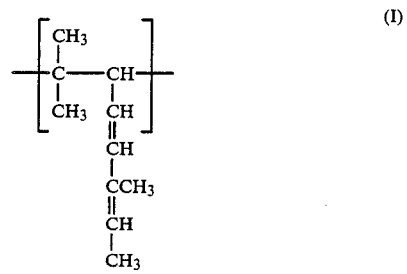

(I)

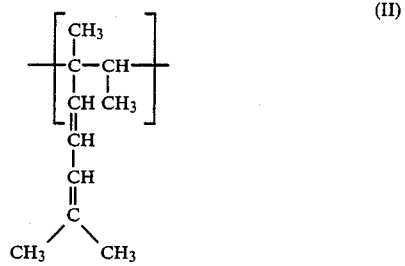

(II)

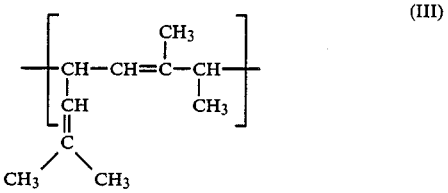

(III)

These poly(alloocimene) polymers comprise mixtures of a majority of chain moieties (I) and (II) as a group and a minority of chain moiety (III). We define 2,3- and 6,7-poly(alloocimene) as that composition consisting of greater than 50 weight percent 2,3-poly(alloocimene), (I), and 6,7-poly(alloocimene), (II), and less than 50 weight percent of 4,7-poly(alloocimene), (III).

The 2,3- and 6,7-poly(alloocimene) used in the present invention as a starting material is prepared in the following manner: substantially anhydrous alloocimene is added slowly to a catalyst system comprised of active metal catalyst component dispersed in a substantially anhydrous ether component under an inert gas atmosphere. Controlled reaction by slow alloocimene addition is necessary because the polymerization is highly exothermic. It is preferred that the alloocimene feed be essentially free of peroxides, water, and alcohols. The active metal catalyst component may be any alkali metal or calcium, substantially freed of surface oxides or other contaminants and being present at a concentration of less than about 25 mole percent of the alloocimene. The active metal catalyst may be present as spheres, wire, foil, or finely divided dispersion and may be in the pure state, as a mixture or an alloy, or as a solution with aromatic hydrocarbons, such as naphthalene, 2-methylnaphthalene, and the like.

The ether components used in this preparation to favorably influence the polymerization are the aliphatic and cycloaliphatic ethers. The ethers are preferred in amounts of greater than about 5 weight percent of the alloocimene. The ether components most preferred are tetrahydrofuran and 1,2-dimethoxyethane. Inert hydrocarbon solvents and diluents may be present, for example, benzene, toluene, xylene, ethylbenzene, pentane, hexane, cyclohexane, heptane, octane, nonane, limonene, p-cymene, and the like, or mixtures thereof.

The polymerizations are carried out at temperatures of from about $-78°$ C. to about $100°$ C., with reaction times of from about 10 minutes to about 500 hours. Most preferably the polymerizations are carried out at temperatures of from about $-30°$ C. to about $60°$ C., with reaction times of from about 1 to about 8 hours.

When polymerization is complete, addition of a proton source, for example, water, an acid, an alcohol, or mixtures thereof, in molar excess of the alkali metal catalysts terminates the reaction and thereby introduces hydrogen atoms at the end of the polymeric chain.

Following the polymerization, the reaction mixture containing the poly(alloocimene) is subjected to distillation in order to remove the ether solvent, unreacted terpenes, any other diluents, and any excess of added termination reagent. Care must be taken not to exceed a temperature of about $150°$ C. in the distillation pot containing the polymer, otherwise excessive thermal degradation of the polymer will occur. The polymer may be discharged while still molten onto a polytetrafluoroethylene coated glass fabric or other suitable surface and allowed to cool. The cooled polymer may then be packaged under a nitrogen atmosphere to protect it from oxidation.

A second polymer isolation procedure, although not requisite, may be employed especially for higher molecular weight poly(alloocimene). This method involves cautious transfer of the terminally active polymer and diluents into a large excess of a nonsolvent, such as methanol, or the like. The poly(alloocimene) precipitates as a white solid. Collecting, redissolving, and reprecipitating the poly(alloocimene) solid several times gives, after finally drying, a poly(alloocimene) free of low molecular weight impurities. The dried, isolated poly(alloocimene) is then packaged and stored in a nitrogen atmosphere until required in the Diels-Alder adduction.

It is advantageous to add an antioxidant, such as 2,6-di-tert-butyl-4-methylphenol or the like, prior to distillative isolation, or in the final precipitation solvent to protect the poly(alloocimene) from oxidizing.

Alternatively, the poly(alloocimene) need not be isolated but the reaction mixture containing the polymer may be used directly in the Diels-Alder reaction to prepare the adducts then used as binder ingredients in the compositions of the invention.

The Diels-Alder reaction used to prepare the resin binder components is well known; see for example Martin and Hill (*Chem. Revs.*, 1961, 61, 537); and Huisgen, The Chemistry of Alkenes, S. Patai, Editor, Chapter II, Part V, p. 878. In general, the reaction comprises the thermal addition of maleic anhydride (the dienophile) to conjugated double bonds residing in 2,3- and 6,7-poly(alloocimene).

More specifically, the Diels-Alder reaction may be carried out by first charging the poly(alloocimene) in relatively pure or crude forms to a suitable reaction vessel with the dienophile. The mixture is stirred and heated to effect Diels-Alder adduction of the dienophile to the polymer. Adductions in the absence of catalyst may be carried out at temperatures of from about $50°$ C. to about $200°$ C., preferably from about $100°$ C. to about $150°$ C. under ambient pressures. Catalysts for the Diels-Alder reaction are well known and may be employed in catalytic proportions, i.e.; a presence of from about 0.001 to about 10 weight percent of the reaction mixture. Representative of catalysts which may be employed are aluminum and zinc compounds. In the presence of such catalysts the reaction temperature is normally from about $0°$ C. to about $100°$ C., preferably around room temperature and under ambient pressure.

The maleic anhydride may be added to the reaction mixture in any amount, preferably an amount equal to or slightly less than 100 mole percent of the amount of conjugated double bonds of the poly(alloocimene).

The Diels-Alder adduction is preferably carried out in the presence of an inert solvent. The term "inert solvent" is used herein to mean a solvent for reactants which does not enter into or adversely affect the desired course of the reaction. Representative of inert solvents are toluene and xylene, which can dissolve both the polymer and the dienophile and which boil at the desired reaction temperature. In this case, the adduction is carried out simply by charging the solvent, polymer, and dienophile to the reaction vessel, and then heating to reflux temperature. Maintaining reflux temperature until adduction is complete, typically 1-30 hours depending on the solvent chosen, results in the desired adduct polymer. The completion of the adduction may be observed by conventional and periodic analyses of the reaction mixture. In particular infrared analysis will show the appearance and increase of anhydride bands characteristic of the adduct polymers.

At the conclusion of the adduction reaction the desired product may be separated from the reaction mixture by conventional techniques. For example, unreacted reagent and solvent may be separated by distillation. Alternatively, the adduct solution may be used without purification to prepare the partial esters also used as binders in the compositions of the invention.

It will be appreciated by those skilled in the art that the adducts employed as resin binders in the ink compositions of the invention are polymers composed of chain units, the majority of which are of the formula:

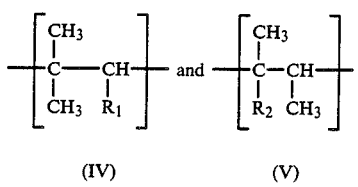

(IV)  (V)

wherein $R_1$ is a monovalent group formed by the adduction of maleic anhydride with the side-chain moity of the formula:

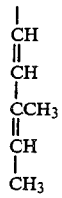

(VI)

and $R_2$ is a monovalent group formed by the adduction of maleic anhydride with the side-chain moiety of the formula:

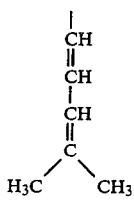

(VII)

The polymer adducts are therefore characterized in part by mixtures of polymer chains, wherein the predominant chain units as described above are those of the formulae (IV) and (V) wherein $R_1$ has the structural formula:

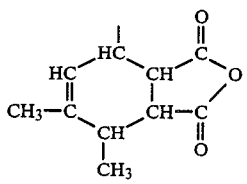

(VIII)

and $R_2$ will have the structural formula:

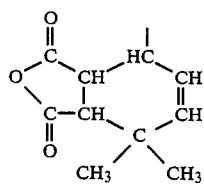

(IX)

The adduct of poly(alloocimene) and maleic anhydride is an active polyanhydride which reacts with alcohols to give partial-esters containing a methyl-branched alkane polymer backbone with pendent half-ester groups. The adduct polymers and the partial esters can be dissolved in aqueous base solution.

The partial-esters of the above-described adducts are also useful resin binders in the ink compositions of the invention. These partial-esters may be characterized in part by possession of a majority of polymer chain units of the formulae (IV) and (V) given above, wherein $R_1$ will have the structural formula:

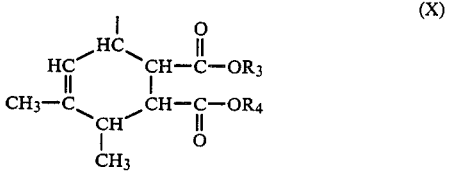

(X)

wherein $R_3$ and $R_4$ are each selected from the group consisting of hydrogen and the residue of an alcohol employed in the esterification of the aforementioned adducts; provided that one of $R_3$ and $R_4$ is always hydrogen.

The $R_2$ moiety in the chain unit of formula (V) of the partial esters used in the compositions of the invention has the structural formula:

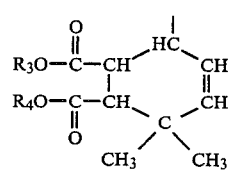

(XI)

wherein $R_3$ and $R_4$ have the meanings ascribed to them in the formula (X) given above.

The partial-esters of the adducts of poly(alloocimene) may be prepared by admixture of the maleic anhydride adducts with a mono-alcohol or a polyol in about stoichiometric or excess proportions and heating the mixtures to a temperature of from about 50° C. to 200° C. The esterification may be catalyzed by the presence of an organic amine such as triethylamine or an alkali metal hydroxide such as calcium hydroxide. The esterification is generally complete in from 1 to 8 hours. The course of the reaction is readily monitored by infrared analysis of the disappearance of anhydride bands and appearance of ester and acid bands.

A wide range of alcohols may be employed in the esterification to obtain the corresponding esters. Representative of alcohols used to obtain water soluble esters are methanol, ethanol, propanol, isobutanol, hexanol, ethylene glycol, hydroxyl-terminated poly(ethyleneoxide), glycerol, 2-ethoxy ethanol, 2-butoxy ethanol, and the like.

The polymer compounds employed as binders in the compositions of the invention possess a wide variety of molecular weights. Representative number average molecular weights are in the range of from about 500 to about 100,000.

In addition to the ingredients specified above, the compositions of the invention may also contain a wide variety of additives commonly found in like aqueous ink compositions. For example, there may also be added viscosity adjusting agents, surfactants, defoamers, microcrystalline and paraffin waxes, pigment extenders such as clays and pigment dispersing aids such as sodium hexametaphosphate or co-solvents like water miscible glycols and other high boiling water-miscible solvents to regulate ink film drying rates.

In general, including all additives the ink compositions of the invention will have solids contents ranging from 15 to about 70% by weight of the total composition; preferably 20 to 50% to insure good color density and printability.

The following preparations and examples describe the manner and process of making and using the invention and set forth the best mode contemplated by the inventor for carrying out the invention, but are not to be construed as limiting. Unless otherwise specified, the parts and percentages are by weight.

PREPARATION 1

To a clean, over-dried, 5 liter four-neck round-bottomed flask, equipped with a thermometer, nitrogen inlet, pressure equalizing addition funnel, a reflux condensor into which was inserted an inert gas exit adapter, and a Nichrome wire stirrer, was added sodium shot (30.4 g) and toluene (200 ml) which had been dried and distilled from calcium hydride. A nitrogen blanket was maintained in the reaction flask at all times. Heat was applied and stirring initiated. The toluene was allowed to gently reflux for 30 minutes, and then it is cooled. At this point dimethoxyethane (518 ml) was added. A preweighed sample of the alloocimene (1945 ml, 44.5% true) which had been dried over calcium hydride and distilled, was charged to the addition funnel. The polymerization temperature of 60° C. was maintained by applying heat with a heating mantle attached to a temperature sensing device. Polymerization was initiated by slowly adding the alloocimene mixture over one hour to the stirred solvent containing sodium metal. After 4.5 hours, the polymerization was complete and the poly(alloocimene) was isolated by transferring the polymer solution into a separatory funnel containing methanol. After deactivation of the catalyst, water and toluene were added, and the polymer solution was thoroughly washed with water. The organic solution was then dried over anhydrous magnesium sulfate and filtered into a round-bottom flask. The solvent and residual ether were removed at reduced pressures. Monoterpenes were isolated at approximately 65° C. (11 mm Hg). The distillation was terminated when the temperature in the pot containing the polymer product reached about 150° C. The polymer was poured while hot into a pan, allowed to cool, then stored under nitrogen. The polymer yield was 470 g, about 70% of theory. It had a glass transition temperature of $-52°$ C. and a number average molecular weight of 463.

PREPARATION 2

Poly(alloocimene) prepared by the procedure of Preparation 1, supra, (100 g, 0.74 moles of terpene units), maleic anhydride (73.1 g, 0.74 moles) and 200 ml of xylene was charged to a reaction flask and heated at reflux for 6 hours under a nitrogen gas blanket. Xylene and small amount of unreacted maleic anhydride was removed by distillation under vacuum. The product resin had a glass transition temperature of 43° C., a number average molecular weight of 820, a Gardner color of 7, and a saponification number of 307 (theory for complete adduction of all terpene units is 481, indicating about 64% adduction efficiency). The infrared spectrum clearly exhibited characteristic anhydride bond vibrations at 1785 and 1860 cm$^{-1}$.

This material was crushed and added (20.4 g) to a mixture of monoethanolamine (8.77 g), di-isobutyl carbinol (1.35 g), Colloids-999 ® defoamer (0.07 g), and water (69.39 g) in a bottle. This mixture was stirred overnight and the resulting varnish (98.9 g) was then charged to a ball-mill with a mixture made by blending barium lithol red presscake of 47% solids content (33.75 g), water (17.25 g), ethanol (1.80 g), and micronized polyethylene (2.10 g). These ingredients were balled-milled for 16 hours to give a red ink, Ink A.

PREPARATION 3

To 150 gms of an adduct prepared in accordance with the procedure of Preparation 2, supra, there was added 200 ml of xylene and 40 ml of ethanol. The resulting mixture was allowed to heat at 80° C. for a period of about 10 hours. At the end of this period, the excess ethanol and xylene were removed by distillation to yield 170 g of a resin product containing acid, ester, and residual anhydride functionality by infrared spectroscopy. This resin was crushed and added (40.84 g) to a mixture of monoethanolamine (7.38 g), diisobutylcarbinol (2.70 g), Colloids-999 (0.14 g), and water (148.94 g) in a bottle. This mixture was stirred overnight and the resulting varnish (98.9 g) was then ball-milled with red pigment as in Preparation 2, supra, to give a red ink, Ink B.

PREPARATION 4

The procedure of Preparation 1 was followed except that tetrahydrofuran (178 g) was used in place of dimethoxyethane, 11.3 g of sodium was used with 200 ml of toluene and 750 ml of alloocimene, and the reaction temperature was 21°–25° C. The product polymer was treated with maleic anhydride (1.0 mole per mole terpene mer unit) in refluxing toluene for 4 hours and worked up as in Preparation 2. This resin had a glass transition temperature of 51° C., a number average molecular weight of 3900, and a Gardner color of 8. This resin was crushed and then stirred in a bottle overnight (40.84 g) with water (138.78 g), monoethanolamine (17.54 g), di-isobutylcarbinol (2.70 g), and Colloids-999 (0.14 g). This varnish (98.9 g) was then ball-milled with red pigment as in Preparation 2 to give a red ink, Ink C.

PREPARATION 5

The procedure of Preparation 1 was followed and a product polymer of number average molecular weight 823 recovered. This polymer (507 g) was dissolved in xylene(1015 ml), filtered through clay to remove some color and particulate matter, and 100 ml of the filtered solution heated with maleic anhydride (22.6 g, ca. 0.85 mole ratio on terpene mer units) for 10 hours at 140° C. The solvent was distilled and the crushed resin product (22.5 g, ring and ball softening point 144 ° C., number average molecular weight 1081, Gardner color of 11 in toluene, 40%) heated and stirred with water (81 g) and sodium hydroxide pellets (5.12 g) at 67° C. for 10 hours. Toward the end of this digestion, di-isobutylcarbinol (1.47 g) and SAG-470 anti-foam (0.08 g) were added. The final varnish pH was 9. It was then ball-milled (100.2 g) with red pigment presscake (79.4 g) and micronized polyethylene (3.9 g) for 7 hours to give a red ink, Ink D.

PREPARATION 6 and 7

Red inks were prepared from two commercial aqueous ink resins using the varnish and pigment ingredients and amounts used in Preparations 2 and 3, supra. The amount of monoethanolamine used was that needed to neutralize the acid value of the resin. Ink E was made from Uni-Rez 7098, a maleated rosin product of Union Camp Corporation. Ink F was made from SMA-1440, a styrene-maleic anhydride product of Arcograph, Inc., a subsidiary of Atlantic-Richfield Corporation.

EXAMPLE 1

Inks A through F were drawn down with a No. 4 Meyer bar on white coated and uncoated test paper stock (bond) from Leneta. The ink viscosities were first measured with a No. 2 Zahn Cup at 25° C. Gloss was determined on the uncoated paper drawdowns on Hunter Lab D-16 and D-48 glossmeters at a 75° angle and dry-rub was tested in duplicate at 20 cycles on a Sutherland Rub Tester and ranked (blind) on a subjective scale from 1 (no rub resistance) to 10 (outstanding rub resistance). Optical densities were determined on a Macbeth Model 49-70 densitometer through a standard green filter.

The test results listed in Table 1 show inks A-D compare favorably to inks E-F made from commercial resins, with the exception of the somewhat higher viscosity of Ink C.

TABLE 1

| Test Results - Poly(alloocimene)-Based Ink Resins in Red Aqueous Ink Formulations | | | | | | |
|---|---|---|---|---|---|---|
| | A | B | C | D | E | F |
| Viscosity (seconds) | 19.8 | 14.4 | a | 16.8 | 23 | 18.3 |
| Bleach Optical Density[b] | 0.61 | 0.57 | n.d. | n.d. | 0.56 | 0.65 |
| Gloss | 9.8 | 6.4 | 9.0 | 12.1 | 5.4 | 8.8 |
| Rub Resistance (aver.) | | | | | | |
| Coated paper | 8.5 | 7.8 | 5 | n.d. | 8 | 8 |
| Uncoated paper | 7 | 7 | 8.5 | 7.5 | 6 | 7 |

[a]This preparation was too viscous to measure with the Zahn Cup.
[b]Measured on a sample diluted 9 to 1 with a standard titanium dioxide white ink.

The ink compositions of the present invention have many advantages over the ink composition disclosed in the prior art. The ink compositions of this invention are based on aqueous solutions of a resin binder exhibiting enhanced wetting of pigment colorants. The ink compositions of the invention also exhibit a stable low solution viscosity (adjustable by adjustment of pH), fast drying, and produce sharp image with a glossy film of good rub-resistance.

What is claimed is:
1. An ink composition, which comprises:
   (a) a coloring proportion of a colorant;
   (b) a resin binder selected from the group consisting of the Diels-Alder adduct of maleic anhydride and a poly(alloocimene) having chain units comprised of a mixture of greater than 50 percent 2,3- and 6,7-poly(alloocimene) and less than 50 weight percent 4,7-poly(alloocimene) chain units, or the partial-esters thereof; and
   (c) water in a sufficient proportion and containing a sufficient proportion of alkali or organic base to solvate the binder.
2. The composition of claim 1 wherein the binder selected is the adduct.
3. The composition of claim 1 wherein the binder selected is the partial-ester of the adduct.
4. The composition of claim 3 wherein the ester is the ethyl ester.

* * * * *